(12) United States Patent
Maus et al.

(10) Patent No.: US 7,709,076 B2
(45) Date of Patent: May 4, 2010

(54) HONEYCOMB BODY CONSISTING OF LAYERS COMPRISING INVERTED SECTIONS AND LAYERS COMPRISING COUNTER-STRUCTURES

(75) Inventors: Wolfgang Maus, Bergisch Gladbach (DE); Rolf Brück, Bergisch Gladbach (DE)

(73) Assignee: Emitec Gesellschaft fuer Emissionstechnologie mbH, Lomar (DE)

( * ) Notice: Subject to any disclaimer, the term of this patent is extended or adjusted under 35 U.S.C. 154(b) by 870 days.

(21) Appl. No.: 10/586,891

(22) PCT Filed: Jan. 7, 2005

(86) PCT No.: PCT/EP2005/000082

§ 371 (c)(1),
(2), (4) Date: Oct. 16, 2006

(87) PCT Pub. No.: WO2005/068798

PCT Pub. Date: Jul. 28, 2005

(65) Prior Publication Data

US 2007/0116977 A1  May 24, 2007

(30) Foreign Application Priority Data

Jan. 13, 2004 (DE) .................... 10 2004 001 947

(51) Int. Cl.
 *B32B 3/12* (2006.01)
 *B32B 3/20* (2006.01)
 *B01D 46/00* (2006.01)

(52) U.S. Cl. ................ 428/116; 428/188; 55/529

(58) Field of Classification Search ............. None
See application file for complete search history.

(56) References Cited

U.S. PATENT DOCUMENTS

| | | | |
|---|---|---|---|
| 4,576,800 | A | 3/1986 | Retallick |
| 5,045,403 | A | 9/1991 | Maus et al. |
| 5,323,608 | A | 6/1994 | Honma |
| 6,080,371 | A | 6/2000 | Tanabe et al. |

FOREIGN PATENT DOCUMENTS

DE          27 33 640          2/1979

(Continued)

*Primary Examiner*—David R Sample
*Assistant Examiner*—Nicole T Gugliotta
(74) *Attorney, Agent, or Firm*—Laurence A. Greenberg; Werner H. Stemer; Ralph E. Locher (57) ABSTRACT

A honeycomb body is formed of alternating layers that are smooth and partially structured. The layers form cavities that allow a fluid to flow in an axial flow direction. The structured layers have structural extremities in contact with smooth neighboring layers and inverted sections in the vicinity of their structural extremities. The sections protrude into the cavities and have a form approximately inverse of the structural extremities in a cross-section through the honeycomb body that runs perpendicularly to the flow direction in such a way that breaks are formed in the structural extremities. Counter-structures are configured in the vicinity of the inverted sections and/or structural extremities in the smooth layers. The structures engage with the structural extremities and/or inverted section. In the honeycomb body, relative displacements of the two layers in the flow direction are prevented by the co-operation of the inverted sections and the counter-structures.

33 Claims, 5 Drawing Sheets

FOREIGN PATENT DOCUMENTS

| | | |
|---|---|---|
| DE | 35 06 610 A1 | 3/1986 |
| DE | 38 44 350 A1 | 7/1990 |
| EP | 0 120 828 A2 | 10/1984 |
| EP | 0 152 560 B1 | 8/1985 |
| EP | 0 298 943 A2 | 1/1989 |
| EP | 0298943 A2 | 1/1989 |
| EP | 0 558 064 A1 | 1/1993 |
| EP | 0 878 909 A1 | 4/1998 |
| EP | 0 870 909 B1 | 10/1998 |
| GB | 1 491 198 | 11/1977 |
| JP | 1-171642 | 7/1989 |
| JP | 3-154639 | 7/1991 |
| JP | 6-198197 | 7/1994 |

HONEYCOMB BODY CONSISTING OF LAYERS COMPRISING INVERTED SECTIONS AND LAYERS COMPRISING COUNTER-STRUCTURES

BACKGROUND OF THE INVENTION

Field of the Invention

The invention relates to a honeycomb body configured from alternating layers that are essentially smooth and layers that are at least partially structured. The structure of the structured layers is in this case typically a corrugation, the latter also having substructures in the form of inverted sections.

In automobile construction especially, increasingly stringent statutory limits in many countries have resulted in the accepted use of catalytic converters for converting harmful constituents of the exhaust gas. Honeycomb bodies are often used as catalyst supports in catalytic converters or else as filters, because they provide a large reaction surface or filter surface per unit volume.

Such honeycomb bodies are formed essentially from ceramic material or as metallic honeycomb bodies comprising a number of layers. In the case of metallic honeycomb bodies, a distinction is drawn in particular between two typical types of construction. An early type of construction, typical examples of which are shown by DE 29 02 779 A1, is the spiral type, in which an essentially smooth sheet-metal layer and a corrugated sheet-metal layer are placed one on top of the other and spirally wound. In another type of construction, the honeycomb body is formed by a multiplicity of alternately arranged smooth and corrugated or differently corrugated sheet-metal layers, the sheet-metal layers first being arranged in one or more stacks and then intertwisted with one another. This makes the ends of all the sheet-metal layers come to lie on the outside and allows them to be connected to a housing or tubular casing, thereby creating numerous connections, which increase the durability of the honeycomb body. Typical examples of these types of construction are described in EP 0 245 737 B1 or WO 90/03220. It has also long been known to provide the sheet-metal layers with additional structures in order to influence the flow and/or achieve cross-mixing between the individual flow channels. Typical examples of such configurations are WO 91/01178, WO 91/01807 and WO 90/08249. Finally, there are also honeycomb bodies of a conical type of construction, possibly also with further additional structures for influencing the flow. Such a honeycomb body is described for example in WO 97/49905. In addition, it is also known to leave a clearance for a sensor, in particular to accommodate a lambda probe, in a honeycomb body. An example of this is described in DE 88 16 154 U1. Honeycomb bodies are also used as adsorber structures in which contaminate constituents, such as nitrogen oxides for example, can be at least temporarily stored, and also as filters, in particular particle filters, which may be formed in an open or closed manner.

In particular in the case of metallic honeycomb bodies, it has been found that, when they are used in the exhaust system of an automobile, they are deformed over time on account of the changing thermal loads. In particular, it is known that the honeycomb body telescopes, that is to say part of the honeycomb body pushes out from one end face of the honeycomb body on account of the pulsatile gas flows to which it is exposed, or that the honeycomb body assumes the form of a barrel, this is to say that the diameter of the honeycomb body is reduced in the region of the gas inlet side and/or gas outlet side. Such deformations and other deformations lead to or are based on the displaceability of neighboring walls of the cavities in the direction of flow, which may occur for example in the case of an absent or defective link in neighboring walls of the cavities, which is formed with preference by thermal joining methods, such as soldering or welding for example.

A catalyst support which is not soldered but is mechanically fixed in corresponding neighboring layers by the interaction of webs and recesses is known from EP 0 298 943 A2. It is known from DE 27 33 640 A1 to achieve corresponding interlocking by tongues and corresponding recesses in neighboring layers.

The interlocking of neighboring layers proves to be problematical whenever there are inverted sections within the honeycomb body, for example in structured layers, these inverted sections serving for influencing the flow, in particular also the connection of cavities neighboring in the circumferential direction, and are known from the aforementioned prior art.

Against this background, the invention is based on the object of providing a metallic honeycomb body which includes measures for influencing the flow and layers of which are effectively protected against relative displacement of neighboring layers in the direction of flow.

SUMMARY OF THE INVENTION

This object is achieved by a honeycomb body with the features of claim 1. Advantageous developments are the subject of the dependent claims.

A honeycomb body according to the invention is formed from alternating layers that are essentially smooth and layers that are at least partially structured and serves in particular as a catalyst support and/or filter, preferably for the exhaust system of an automobile. In this case, the layers form cavities that allow a fluid to permeate essentially in an axial direction of flow, the structured layers having structural extremities which are in contact with essentially smooth neighboring layers, and the structured layers having in the region of their structural extremities inverted sections which protrude into the cavities and have a form that is approximately the inverse of that of the structural extremities in a cross section through the honeycomb body that runs perpendicularly to the direction of flow, so that interruptions are produced in the structural extremities in the region of the inverted sections. According to the invention, counter-structures are formed in the essentially smooth layers in the region of the inverted sections and/or the structural extremities and engage with the structural extremities and/or with the inverted sections.

It is particularly favorable if the structural extremities and/or the inverted sections interact with the counter-structures with a positive fit, so that, in particular, a displacement of the layers with respect to one another in the direction of flow is prevented.

An inverted section is understood in this connection as meaning a structure that is formed by re-shaping a structured layer. Such an inverted section creates an opening through which the flow can pass and which forms a connection with a neighboring cavity. Through this opening, fluid, such as exhaust gas for example, which flows through the honeycomb body can consequently pass from one cavity to a neighboring cavity. This opening is formed with preference in the direction of flow. On account of the additional flow-accepting edges of the inverted section, inverted sections advantageously lead to vortexing of the flow, which counteract the formation of laminar marginal flows. It is therefore advisable that a positively fitting connection with counter-structures does not close the entire opening created in this way again but takes up only quite a small part of the opening cross section. In the most favorable case, the positively fitting connection may have dimensions that are only of the order of magnitude of the thickness of the layers.

In particular, it is advantageous to form the inverted sections symmetrically with respect to the structuring, that is to say symmetrically in relation to the structure minimum or maximum. Structuring is to be understood in particular as meaning a corrugation that is customary for example in the case of metallic honeycomb bodies, for example sinusoidal or triangular corrugation. Essentially continuous structures are to be understood in particular as structures which—apart from the inverted sections—extend over the entire length of the honeycomb body in the direction of flow. With preference, the coverage of the cross section through which flow can pass, brought about by the counter-structures when they engage in the inverted section, is as small as possible. Forming of the inverted sections in the region of the structural extremities may also mean, for example, that only part of the structuring contributes to the inverted section, that in particular only a relatively small part of the material of the walls forming the structuring is inverted, so that the basic form of the structuring is preserved in the region of the inverted section.

If essentially smooth layers, in particular sheet-metal layers or layers formed from fibers, are provided with a counter-structure, which is intended to run in the honeycomb body approximately transversely in relation to the later direction of flow, these layers must be wound during the formation of the honeycomb body, the winding direction being precisely such that the counter-structures would make such winding considerably more difficult or even prevent it, since they stiffen the layer. The counter-structures should therefore be configured in such a way that the flexibility of the layers is adequate for winding, even with small radii. This can be achieved in various ways, in particular of course by the counter-structures not being elevations or depressions but simply holes into which the extremities of the structured layers protrude. Counter-structures are also possible as elevations and/or depressions, however, as long as they are sufficiently pliable as a result of suitable dimensioning and/or interruptions. Continuous elevations and/or depressions can be modified by interruptions, for example holes or relieving slits, in such a way that the layer is still sufficiently pliable in spite of counter-structures being present.

The described forming of the inverted section and counter-structure has the effect that, in the case of a honeycomb body according to the invention, a relative displacement in the direction of flow of two cavity walls which are neighboring in a direction that is essentially perpendicular to the direction of flow cannot occur, since only the honeycomb body as a whole can be displaced. This is the case even if the layers of the honeycomb body according to the invention are thermally connected to one another, for example soldered or welded, and these thermally formed connections have become at least partially detached. The reason for this is that the counter-structures which engage in the inverted section prevent a relative displacement of two cavity walls neighboring in a direction that is essentially perpendicular to the direction of flow.

A layer may be formed from various types of materials. For example, the forming of at least some of the layers from sheet metal, with preference corrosion- and high-temperature-resistant steel sheets or else aluminum sheets is possible and in accordance with the invention. Furthermore, according to the invention, at least some of the layers may be formed from material that at least partially allows a fluid to flow through, for example a metallic fiber material. The forming of at least some of the layers from a composite material, for example a material that at least partially allows a fluid to flow through consisting of ceramic and metallic fibers, is also possible and in accordance with the invention. Here, a ceramic fiber layer may be reinforced by a connection to sheet-metal strips established by a joining technique.

A honeycomb body according to the invention may advantageously be used as a catalyst support and/or filter in the exhaust system of an automobile. It may be used with particular preference in the form of a particle filter. Such a particle filter may be both open and closed. In the case of open particle filters, particles of dimensions that are significantly larger than the pores of the filter media used can pass through the particle filter, so that clogging of the filter is not possible, whereas no particles can pass through a closed particle filter. Furthermore, the use of a honeycomb filter according to the invention near the engine, in particular upstream of a turbocharger, is advantageously possible. Use as an adsorber for one or more components of the exhaust gas, such as nitrogen oxides ($NO_x$) for example, is also possible and in accordance with the invention. Furthermore, the basic configuration of a honeycomb body according to the invention as described above in the prior art, that is to say for example as a spiral form, an S form or an involute form, is possible and in accordance with the invention, as are all the embodiments, additions and/or possibilities for use that are described in the cited prior art.

According to an advantageous configuration of the honeycomb body according to the invention, the honeycomb body is formed from a) at least one layer that is essentially smooth and at least one layer that is at least partially structured or b) at least one layer that is at least partially structured, inverted sections and/or counter-structures being formed in a layer that is essentially smooth and/or in a layer that is at least partially structured. It is particularly preferred in this connection that the honeycomb body is formed by a) winding at least one layer or b) stacking a plurality of layers to form at least one stack and twisting at least one stack.

The forming of the honeycomb body from sheet-metal layers that are essentially smooth and/or sheet-metal layers that are at least partially structured advantageously makes it possible to form a honeycomb body according to the invention. However, it is equally advantageous and possible according to the invention not to configure the honeycomb body completely from sheet-metal layers but at least partly to use other layers, in particular metallic layers. These may be, for example, layers consisting of material that at least partially allows a fluid to flow through, for example metallic fiber mats, which may be used for the configuration of a particle filter, but also composite materials, which may consist of ceramic and metallic fibers and possibly also portions of sheet metal. The use of perforated sheet-metal layers is also of advantage for some applications.

When the honeycomb body is configured at least partly from sheet-metal layers, the honeycomb body may for example be wound or twisted in a spiral form, in an S form or in an involute form, reference being made to the prior art cited above for details. However, other forms of a honeycomb body are also possible and in accordance with the invention.

According to an advantageous configuration of the honeycomb body according to the invention, in which inverted sections are formed in layers that are at least partially structured with a structure height H, the height h of the inverted sections is less than or equal to the structure height H.

According to a further advantageous configuration of the honeycomb body according to the invention, in which inverted sections are formed in layers that are at least partially structured with a structure height H, the height h of the inverted sections is greater than the structure height H.

Depending on the height h of the inverted sections, the counter-structures may be formed of a matching type. For example, whenever the height h of the inverted sections is greater than the structure height H of the structured layers, the counter-structure may simply comprise a slit in the neighboring layer, which is for example essentially smooth. The extent of the slit in the direction of flow is advantageously made to match the corresponding extent of the inverted section, so that a positive fit is obtained. A further possibility is that the counter-structure also comprises a corresponding inverted section, or the recess which the inverted section leaves behind in the structures. With a corresponding extent of the inverted sections in the direction of flow, it is also possible here to establish a positive fit of the inverted section and the counter-structure between two neighboring walls of the cavities.

If the height h of the inverted sections is less than the structure height H of the at least partially structured layers, a counter-structure may be formed as a microstructure formed essentially perpendicular to the direction of flow, for example in the form of a barrier. Here it is possible that at least one microstructure is formed in a way corresponding to a first and/or a second delimitation of the inverted section in the direction of flow. For example, two counter-structures which together engage in an inverted section may be formed, it being possible for the distance between the counter-structures in the direction of flow to be chosen such that it corresponds essentially to the extent of the inverted section in the direction of flow.

According to the invention, not every inverted section must be in engagement with a counter-structure; depending on the application, it may be advantageous to bring only some of the inverted sections into engagement with counter-structures, for example only every tenth one, twentieth one or every second one, fourth one, etc. Here, the reference to "every tenth one, twentieth one", etc. means that the tenth, twentieth, etc. part of the inverted sections is in engagement with counter-structures.

According to a further advantageous configuration of the honeycomb body, the height a of a counter-structure is less than, with preference much less than, the height h) of the inverted sections.

In this way it is advantageously possible to bring the counter-structure and the inverted section into engagement, or even to produce a positive fit, without the pressure loss of the flow through the channel being significantly increased.

According to an advantageous configuration of the honeycomb body, every inverted section is in engagement with a counter-structure.

The forming of a counter-structure for every inverted section is also possible in accordance with the invention and may be advantageous, depending on the application.

According to an advantageous configuration of the honeycomb body, at least some of the counter-structures comprise inverted sections.

The forming of the counter-structures from inverted sections allows the honeycomb body to be configured in a simple way, for example from only one type of layers which have inverted sections. If these inverted sections are correspondingly formed, it is possible for example to dispense with the forming of essentially smooth layers. Furthermore, it is also possible and in accordance with the invention also to provide the essentially smooth layers with inverted sections, which can be brought into engagement with inverted sections in the at least partially structured sheet-metal layers. It is also possible and in accordance with the invention to configure a honeycomb body in which only some of the counter-structures are inverted sections and others are a different type of counter-structure. With different types of counter-structure, it is advantageously possible for example to influence the pressure conditions inside the honeycomb body. The distribution of the flow through the honeycomb body into different regions is also possible and in accordance with the invention.

According to a further advantageous configuration of the honeycomb body according to the invention, at least some of the counter-structures comprise embossings.

The forming of the counter-structures as embossings is a particularly simple form of the counter-structure. Such embossings may for example be formed in the layers that are essentially smooth and/or in layers that are at least partially structured.

It is particularly preferred in this connection that the embossings are formed as microstructures which run essentially transversally to the axial direction of the honeycomb body.

A microstructure is understood in this connection as meaning a structure which, when the honeycomb body is configured at least partly from layers that are at least partially structured, has a smaller structure height than the structure of the at least partially structured layers. A microstructure may be formed both in layers that are essentially smooth and as a secondary structure in layers that are at least partially structured.

According to an advantageous configuration of the honeycomb body according to the invention, at least some of the counter-structures comprise at least two embossings spaced apart in the direction of flow.

Two or more axially spaced-apart embossings advantageously make the positive fit between the inverted section and the counter-structure possible without the interaction of the inverted section and the counter-structure causing a significantly increased pressure loss. In particular, two embossings between which the distance in the direction of flow corresponds with preference to the dimensions of an inverted section in the direction of flow advantageously prevent relative displacement of the honeycomb body in the direction of flow, that is to say in particular the telescoping effect, and so increase the lifetime of the honeycomb body.

According to a further advantageous configuration of the honeycomb body according to the invention, the embossings have perforations, in particular microperforations. Microperforations are distinguished by the fact that their dimensions are much smaller than the dimensions of the structures of the layers that are at least partially structured. In the case of metallic layers, in particular sheet-metal layers, the formation of perforations in the embossings facilitates the deformability of the layer, in particular the windability. The embossings are interrupted or restricted by the perforations.

According to a further advantageous configuration of the honeycomb body according to the invention, at least some of the counter-structures are formed as holes.

With corresponding configuration of the inverted sections, the counter-structures can be brought into engagement with the latter, in particular even with a positive fit. Holes as counter-structures are simple to provide. The dimensions of the holes in the direction of flow advantageously correspond to the dimensions of the inverted sections in the direction of flow.

The form and configuration of the counter-structures are not restricted to the examples represented here. In particular, different forms and configurations of counter-structures may even be formed in a single honeycomb body or even within a single layer.

According to a further advantageous configuration of the honeycomb body according to the invention, at least some of the counter-structures are formed in a layer that is essentially smooth.

This allows for example the prevention of relative displacement of the honeycomb body in the direction of flow in a layer that is at least partially structured and a layer that is at least essentially smooth.

According to a further advantageous configuration of the honeycomb body according to the invention, at least some of the counter-structures are formed in a layer that is at least partially structured.

This makes it possible for the invention to be realized for example in honeycomb bodies which are formed only from layers that are at least partially structured, in particular metallic layers such as sheet-metal layers.

However, in the same way, counter-structures can be formed according to the invention both in layers that are essentially smooth and in layers that are at least partially structured.

A further advantageous configuration of a honeycomb body according to the invention is distinguished in that the quotient of a) the sum of the height (h) of the inverted section and the height (a) of the counter-structure and b) the radial distance (KH) between two walls of the cavities is less than 1.

That is to say that the following relationship is obtained:

$$(h+a)/KH<1.$$

Such a configuration of the inverted sections and the counter-structures advantageously ensures good long-term durability even under the very abrasive conditions in which a honeycomb body is used for example as a catalyst support in the exhaust system of an automobile, distinguished for example by the loading caused by strongly pulsatile gas flows and great thermal gradients and transients. Relative displacements in the direction of flow in the honeycomb body are effectively prevented.

According to a further advantageous configuration of the honeycomb body according to the invention, at least some of the layers are metallic layers. It is particularly preferred in this connection that at least some of the metallic layers are sheet-metal layers. These preferably have a thickness of less than 60 μm, with preference less than 40 μm, with particular preference less than 25 μm.

According to a further advantageous configuration of the honeycomb body according to the invention, at least some of the metallic layers at least partially allow a fluid to flow through. It is particularly preferred in this connection that at least some of the metallic layers that at least partially allow a fluid to flow through are formed from a metallic fiber material, in particular a sintered metallic fiber material.

According to a further advantageous configuration of the honeycomb body according to the invention, at least some of the layers are configured from a composite material, with preference a composite material consisting of ceramic and metallic fibers.

The invention is to be described below on the basis of the exemplary embodiments shown in the drawings, without being restricted to these.

DESCRIPTION OF THE PREFERRED EMBODIMENTS

Figure 1:
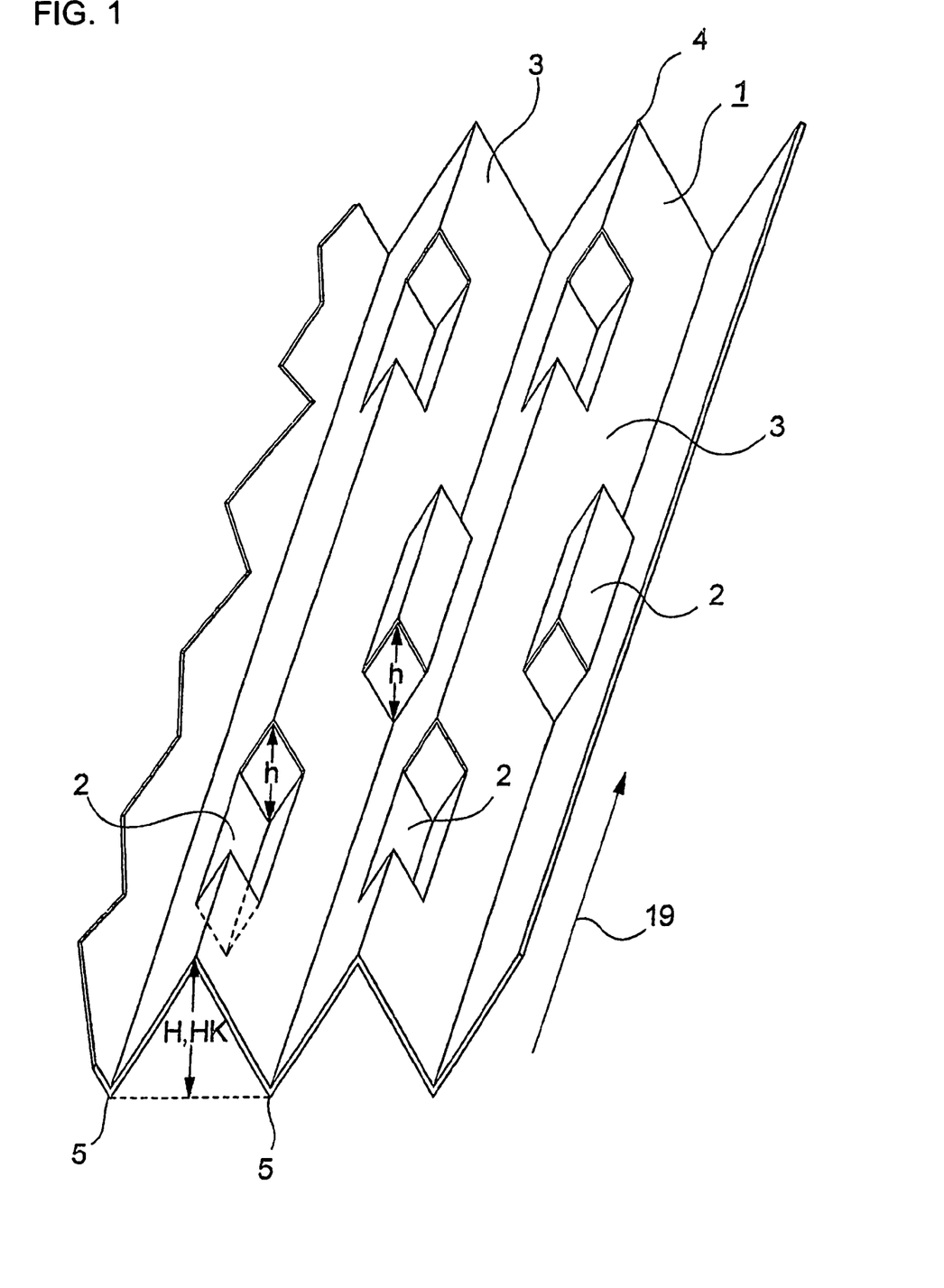
FIG. 1 shows a layer that is at least partially structured, with inverted sections.

FIG. 1 shows a layer 1 that is at least partially structured, for example consisting of a thin metal foil, in particular a thin corrosion-resistant steel foil, with inverted sections 2. In the present exemplary embodiment, the layer 1 that is at least partially structured has triangular structures 3 (all embodiments apply however in the same way to other forms of corrugation, which however cannot be graphically represented as clearly), which extend over the entire length of the layer 1 apart from the regions with inverted sections 2. These structures 3 have in each case structure maxima 4 and structure minima 5 (together referred to as structural extremities) and form with other layers cavities that allow a fluid, for example an exhaust gas, to flow through. Respectively formed in the region of the structure minima 4 and/or the structure maxima 5 are inverted sections 2 of a height h. In the region of the structural extremities 4, 5, the layer 1 is folded in one direction. An inverted section 2 is a re-shaping of the material of the layer 1, the latter being curved or folded in a second, opposite direction, that is to say forming a shape that is approximately inverse in relation to the basic structure. When a honeycomb body is configured at least partly from such layers 1, the honeycomb body can be flowed through by a fluid, in particular exhaust gas, essentially in the direction of the direction of flow 19.

Figure 2:
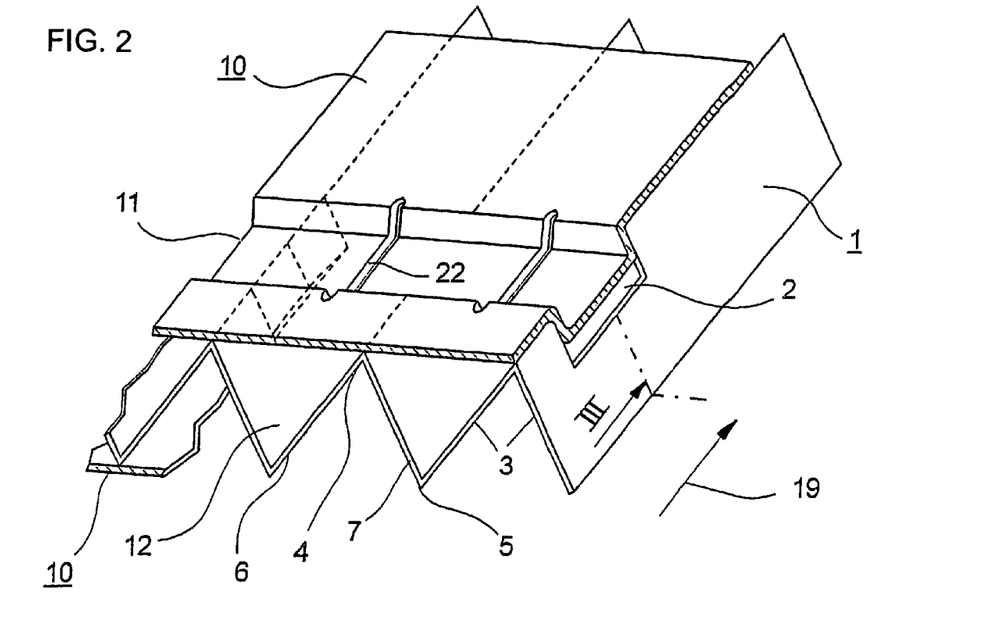
FIG. 2 shows a schematic perspective view of part of a honeycomb body.
Figure 3:
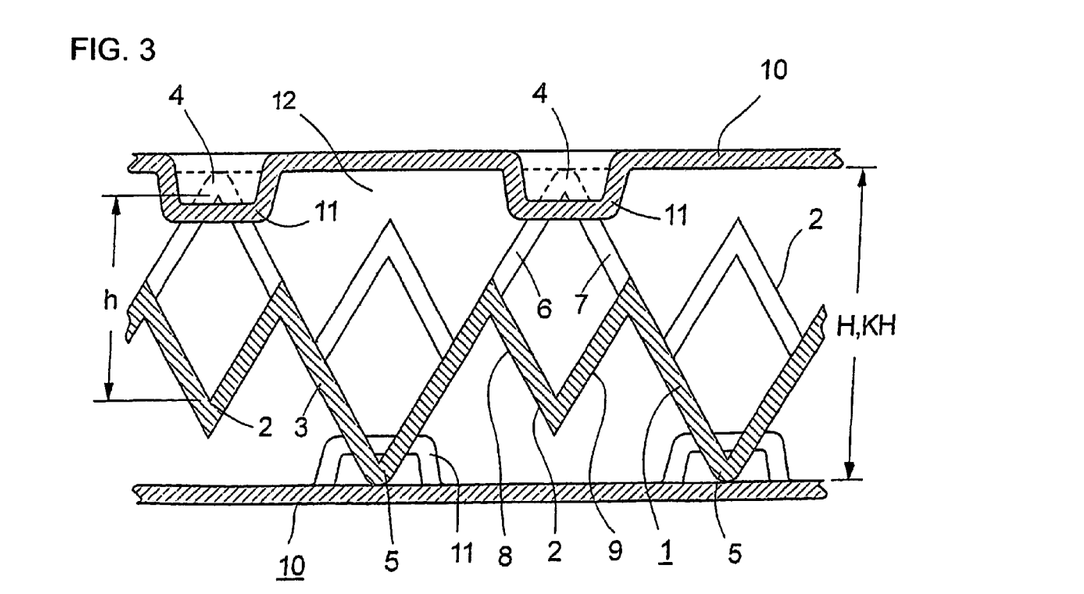
FIG. 3 shows a schematic cross section through the part of a honeycomb body from FIG. 2, along the line III.

FIG. 2 shows a schematic perspective view of the positively fitting interaction between a structured layer 1 and an essentially smooth layer 10 with a counter-structure 11. FIG. 3 shows a cross section through FIG. 2 along the line III. The structure 3 of the structured layer 1 has structure maxima 4 and structure minima 5. Furthermore, an inverted section 2 is formed. The inverted section 2 is formed by a re-shaping of the material of the layer 1. The structure 3 as such (that is to say considered without the inverted section) has a folding or a curvature in a first direction. In the case of a triangular corrugation, as in the present example, this means that the structure 3 is made up of a first flank 6 and a second flank 7, which in cross section form two straight lines. Here, the first flank 6 has a first flank slope and the second flank 7 has a second flank slope, the algebraic signs of which are opposite. In the present example, the inverted section 2 is also formed by two flanks, namely a first inversion flank 8 and a second inversion flank 9. When the inverted section 2 is formed, the first inversion flank 8 is created from the first flank 6 and the second inversion flank 9 is created from the second flank 7. In cross section, the first inversion flank 8 and the second inversion flank 9 form two straight lines, the slopes of which have different algebraic signs. Consequently, the folding of the inverted section 2 lies essentially in a direction that is opposite the direction of the folding of the structural extremities 4, 5, the forms of the structure 3 and of the inverted sections 2 being approximately opposed.

Furthermore, FIGS. 2 and 3 show two neighboring metallic layers 10 that are essentially smooth, which in this example have counter-structures 11 formed as a microstructure. These counter-structures 11 comprise an embossing in the form of a barrier, which is formed in the region neighboring the inverted section 2. This counter-structure 11 engages in an inverted section 2. With preference, the counter-structure 11 is formed in such a way that there is a positive fit between the counter-structure 11 and the inverted section 2. In order to increase the flexibility of the layer 10, which is otherwise very stiff as a result of the counter-structure 11, relieving slits 22 are present, preferably with rounded ends, in order to avoid a notch effect and further tearing. The engagement or positive fit between the inverted section 2 and the counter-structure 11 advantageously prevents relative movement between the layer 1 that is at least partially structured and neighboring metallic layers 10 that are essentially smooth. If a honeycomb body, for example a catalyst support or filter for use in particular in automobile construction, is configured from such layers 1, 10, relative movement of the layers 1, 10 therein is advantageously prevented, in particular telescoping of the honeycomb body is avoided. The layer 1 that is at least partially structured has triangular structures 3 of a structure height H. The inverted sections 2 are formed in the region of the structure minima 4 and structure maxima 5, to be precise symmetrically in relation to the structural extremities 4, 5. In the present example, the height h of an inverted section 2 is less than the structure height H of the structures 3. Furthermore, counter-structures 11, the height a of which is much less than the height h of the inverted sections 2, are formed in the metallic layers 10 that are essentially smooth. By way of example, a counter-structure 11 is depicted for each inverted section 2, but it is equally possible to provide only some of the inverted sections 2 with counter-structures 11. When establishing the relative number of inverted sections 2 per counter-structure 11, when designing the form of the counter-structure 11 and when deciding whether to form a pure engagement or a positive fit of the counter-structure 11 with the inverted section 2, the kind of use envisaged later may be advantageously taken into consideration. For example, catalyst supports that are used in the exhaust system of a spark-ignition engine are exposed to different loads with respect to pulsation frequency and amplitude, as well as temperature of the exhaust gas, than for example in the case of diesel or rotary engines. The position of a catalyst support with respect to an internal combustion engine (for example near the engine, in the manifold, etc) also has great effects on the loads that the catalyst support has to withstand.

When a honeycomb body is configured as described above, that is to say by winding or coiling one or more layers, cavities 12 that allow a fluid to flow in or through and are delimited by the layers 1, 10 are formed. The radial distance KH between two neighboring walls of the cavities 1, 10 corresponds essentially to the structure height H.

Apart from the type of counter-structures 11 shown in FIGS. 2 and 3, there are many other possible forms of counter-structures, some of which are shown by way of example in further figures. The various types of counter-structures 11 may be combined as desired in the honeycomb body according to the invention. Furthermore, inverted sections 2 and counter-structures 11 also do not have to be formed in the entire honeycomb body, it also possible and in accordance with the invention for them to be formed in certain regions, for example only in an axial or radial subregion. In another subregion, for example, holes of dimensions which are greater, with preference much greater, than the structure repeat length of the structures 3 may be formed.

Figure 4:
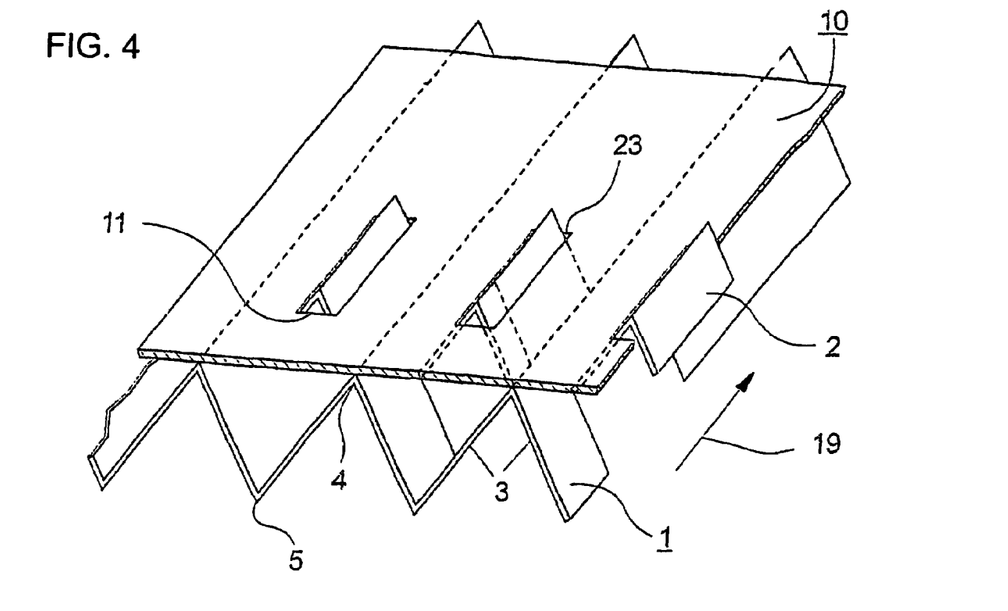
FIG. 4 shows an example of a positive fit by holes in counter-structures formed in a layer that is essentially smooth.
Figure 5:
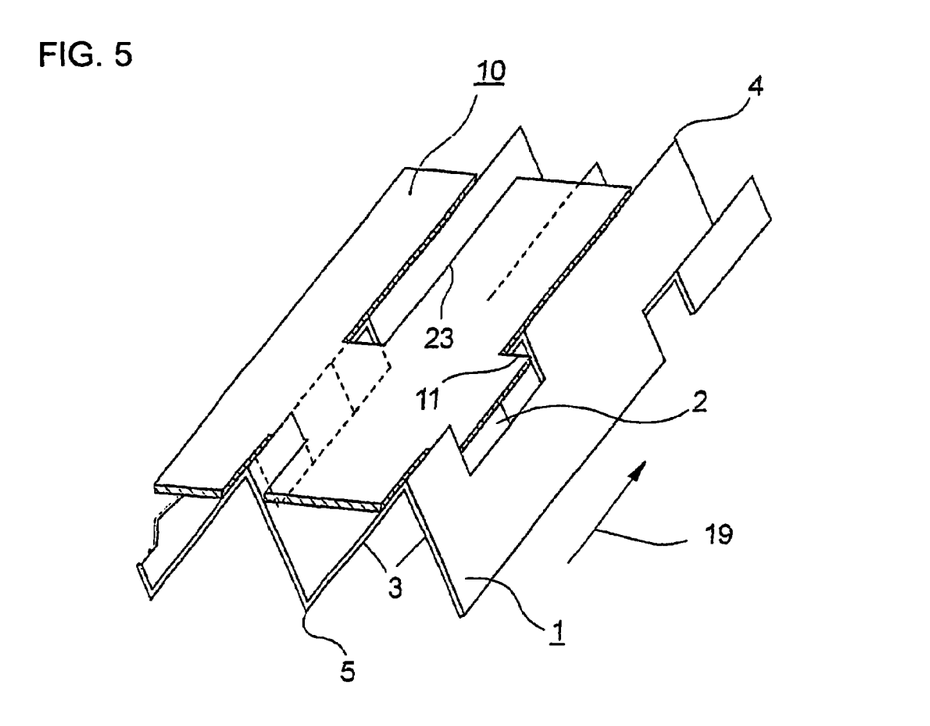
FIG. 5 shows another example of a positively fitting connection between smooth and corrugated layers with inverted sections.

FIGS. 4 and 5 show in a schematic perspective view how holes 23 can act as counter-structures 11, in that they interact with structural extremities 4, 5 of the structure 3 or with inverted sections 2. These embodiments are particularly advantageous, because the holes 23 do not reduce, but even increase, the flexibility of the layers that are essentially smooth.

Such metallic layers 1, 10 may be at least partly thin sheet-metal layers, with preference of a thickness of less than 60 µm, with particular preference less than 40 µm, in particular less than 25 µm. The layers 1, 10 may also consist at least partly of a material that at least partially allows a fluid to flow through, for example a metallic fiber material which is for example sintered from powder, chips or fibers or else applied to a supporting structure, such as for example an expanded metal mesh.

Figure 6:
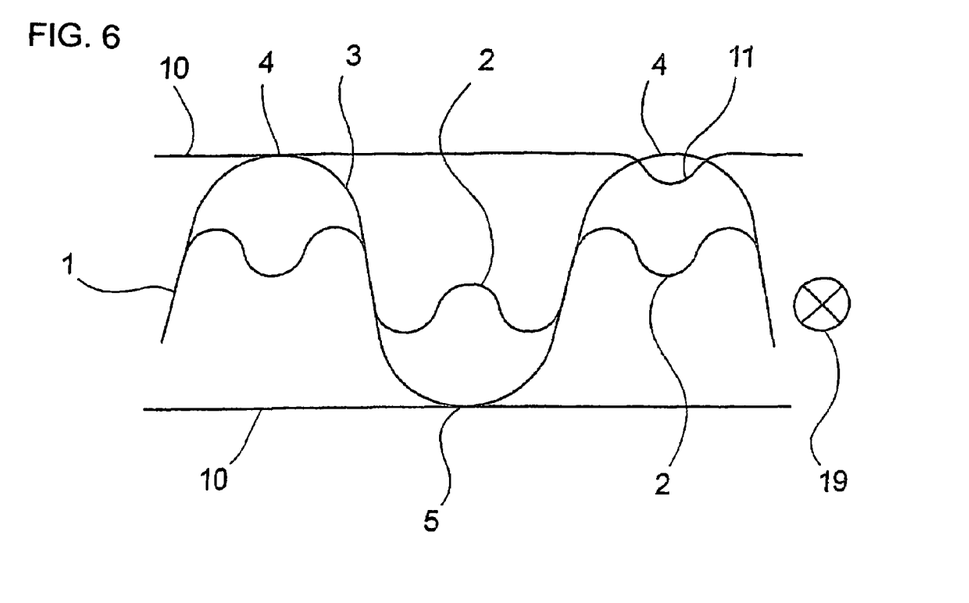
FIG. 6 shows a further example of a layer that is at least partially structured, with inverted sections, and corresponding layers that are essentially smooth, with counter-structures.

FIG. 6 shows a further exemplary embodiment of layers 1, 10 for configuring a honeycomb body according to the invention. Here, the layer 1 that is at least partially structured is sinusoidally corrugated and has structures 3. Also formed are inverted sections 2, which are curved in a direction which is opposite the curvature of the corresponding structures 3 in this region. The inverted sections 2 are formed symmetrically in relation to the structures 3 in the region of the structure maxima 4 and the structure minima 5. Only part of the material forming the structures 3 contributes to the forming of the inverted sections 2. The counter-structure 2 is formed as an embossing. It is also advantageously possible for a number of counter-structures 11, for example two, to be formed per inverted section 2, advantageously being able to be spaced at a distance in the direction of flow 19 that corresponds to the extent of the inverted section 2 in the direction of flow 19.

Figure 7:
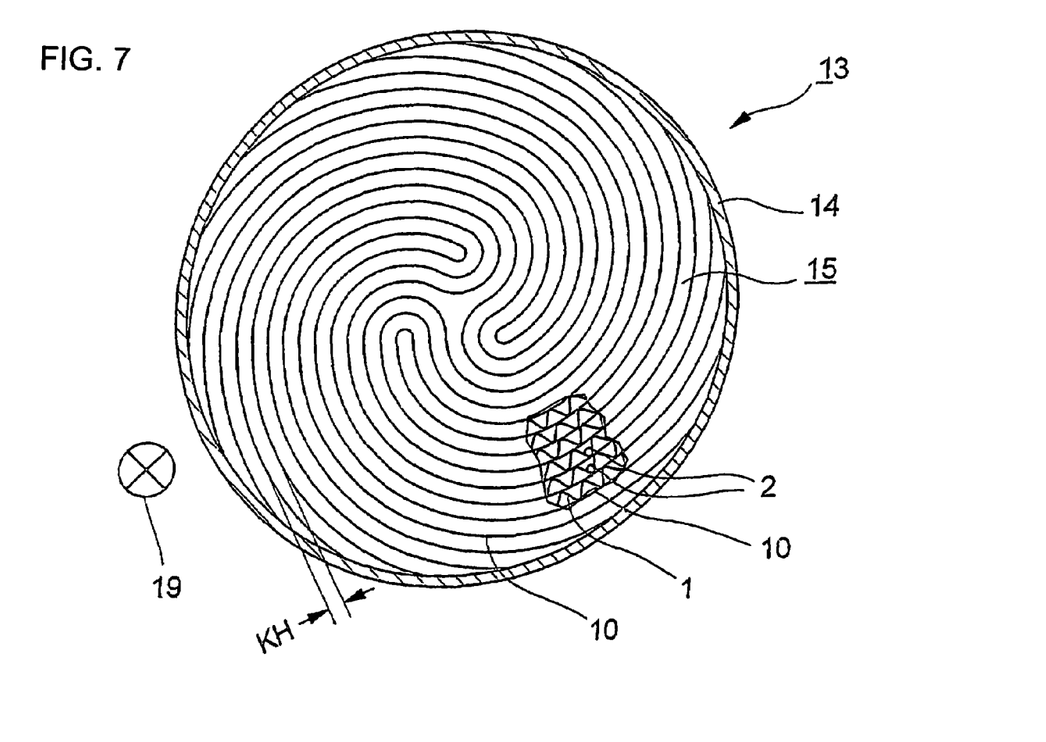
FIG. 7 shows a honeycomb body according to the invention in cross section.

FIG. 7 shows a honeycomb body 13 according to the invention in cross section, which has a honeycomb structure 15 formed in a tubular casing 14. The honeycomb structure 15 is configured from metallic layers 10 that are essentially smooth and metallic layers 1 that are at least partially structured, which have inverted sections 2 according to the invention, only shown in an exemplary manner, in the metallic layers 1 that are at least partially structured and have counter-structures 11, not shown for the sake of overall clarity, in the metallic layers 10 that are essentially smooth. The metallic layers 1, 10 form cavity walls extending in the direction of flow 19 and delimiting cavities 12. The distance KH between two cavities 1, 10 in a direction essentially perpendicular to the direction of flow 19 is defined in the present example essentially by the structure height H. Such a honeycomb body 13 according to the invention allows a fluid, such as an exhaust gas for example, to flow through in the direction of flow 19.

Figure 8:
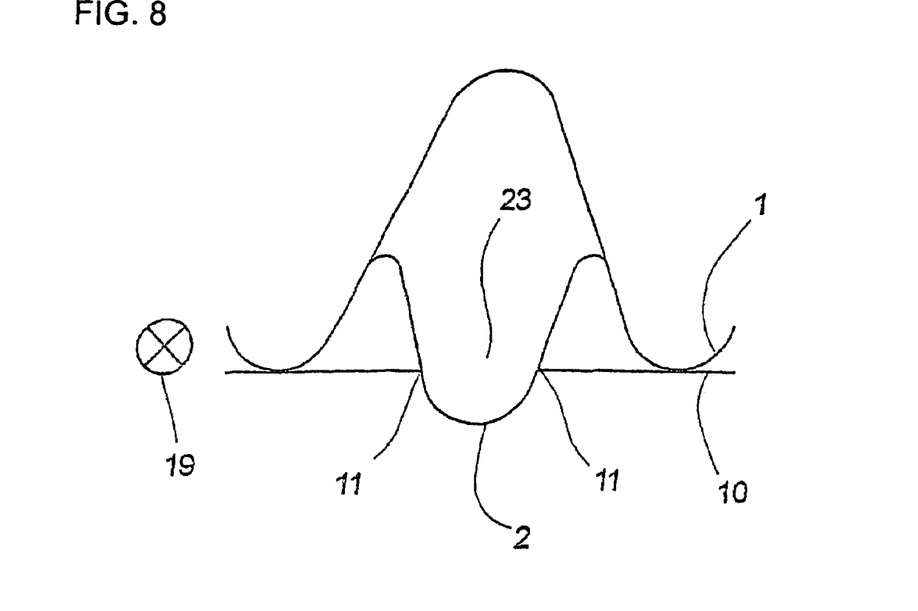
FIG. 8 shows a further example of a layer that is at least partially structured and a layer that is essentially smooth, with inverted sections and counter-structures, in schematic cross section.

FIG. 8 schematically shows in cross section a further example of a counter-structure 11. The layer 1 that is at least partially structured has an inverted section 2, which protrudes through the counter structure 11, formed as a hole 23 in the layer 10 that is essentially smooth, into a radially neighboring cavity. The matching of the dimensions of the hole 23 to the dimensions of the inverted section 2 advantageously allows the forming of a positive fit between the inverted section 2 and the counter-structure 11.

Figure 9:
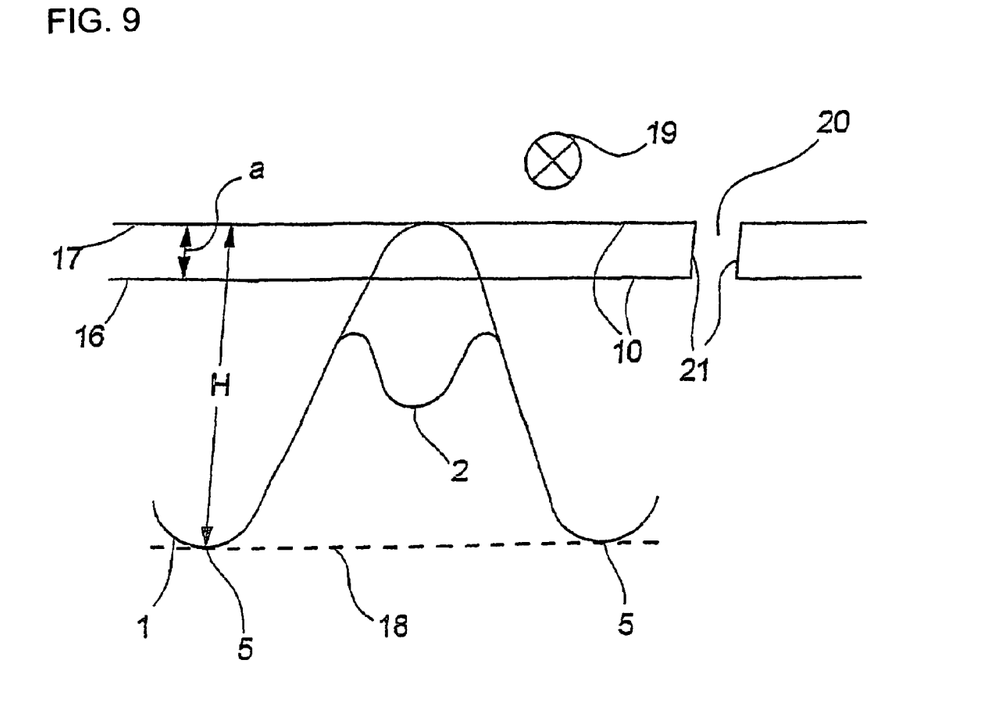
FIG. 9 shows a further example of a layer that is essentially smooth and a layer that is at least partially structured, with inverted sections and counter-structures, in schematic cross section.

FIG. 9 shows a further example of a counter-structure 11 schematically in cross section. This counter-structure 11 is formed as an embossing in the layer 10 that is essentially smooth, in the regions in the direction of flow 19 in which there are inverted sections 2. The embossing runs in the transversal direction, that is to say essentially perpendicularly to the direction of flow 19 in which the layers 1, 10 extend. The embossing has the effect that the essentially smooth layer has a smooth level 17 and an embossed level 16. Here, the distance of the smooth level 17 from the reference plane 18, which is depicted by dashed lines and is defined by the structure minima 5, corresponds to the structure height H, whereas the distance of the embossed level 16 from the reference plane 18 corresponds to the difference between the structure height H and the height a of the counter-structure 11. The embossed level 16 therefore differs from the smooth level 17 by the height a of a counter-structure 11. In order to increase the deformability of the layer 10 that is essentially smooth, perforations 20 with perforation edges 21 are formed in the region of the embossing.

In a honeycomb body 13 according to the invention, relative movements of the layers 1, 10 with respect to one another in the direction of flow 19 are prevented by the interaction of inverted sections 2 and counter-structures 11 assigned to them. This takes place by the counter-structure 11 and the inverted section 2 being in engagement with each other. In this way it is also possible in particular for the telescoping of honeycomb bodies 13 to be prevented.

LIST OF DESIGNATIONS 1 layer that is at least partially structured
2 inverted section
3 structure
4 structure maximum
5 structure minimum
6 first flank
7 second flank
8 first inversion flank
9 second inversion flank
10 layer that is essentially smooth
11 counter-structure
12 cavity
13 honeycomb body
14 tubular casing
15 honeycomb structure
16 embossed level
17 smooth level
18 reference plane
19 direction of flow
20 perforation
21 perforation edge
22 relieving slit
23 hole
a height of a counter-structure
h height of an inverted section
H structure height
KH radial distance between two cavity walls

We claim:
1. A honeycomb body, comprising:
a plurality of alternating layers including substantially smooth layers and at least partially structured layers, said layers forming cavities enabling a fluid to flow therethrough in a substantially axial direction of flow;
said at least partially structured layers having structural extremities in contact with substantially smooth adjoining layers, and said structured layers having inverted sections in a region of said structural extremities, said inverted sections protruding into said cavities and having a shape approximately inverse of a shape of said structural extremities in a cross section through the honeycomb body perpendicular to the direction of flow, forming interruptions in said structural extremities in a region of said inverted sections; and
counter-structures formed in said substantially smooth layers in a region of at least one of said inverted sections and said structural extremities and engaging with the least one of said structural extremities and said inverted sections.

2. The honeycomb body according to claim 1, wherein said counter-structures are in contact with at least some of said structural extremities and/or said inverted sections, with a form-locking positive fit.

3. The honeycomb body according to claim 1, wherein said counter-structures are formed in said substantially smooth layers to ensure a flexibility of said layers to remain sufficiently great for winding.

4. The honeycomb body according to claim 3, wherein said counter-structures have holes and/or interruptions formed therein.

5. The honeycomb body according to claim 3, wherein said layers of the honeycomb body are formed by:
a) at least one wound layer; or
b) a plurality of stacked layers together forming at least one stack, and wherein said stack is twisted.

6. The honeycomb body according to claim 1, wherein said inverted sections are formed in layers that are at least partially structured with a given structure height, and wherein a height of said inverted sections is less than or equal to the structure height.

7. The honeycomb body according to claim 1, wherein said inverted sections are formed in layers that are at least partially structured with a given structure height, and wherein a height of said inverted sections is greater than the structure height.

8. The honeycomb body according to claim 1, wherein said counter-structure is an elevation or depression having a height that is smaller than a height of said inverted sections.

9. The honeycomb body according to claim 8, wherein the height of said counter-structure is smaller than the height of said inverted sections by at least an order of magnitude.

10. The honeycomb body according to claim 1, wherein each one of said inverted sections is in engagement with a respective said counter-structure.

11. The honeycomb body according to claim 1, wherein at least some of said counter-structures comprise inverted sections.

12. The honeycomb body according to claim 1, wherein at least some of said counter-structures comprise embossings.

13. The honeycomb body according to claim 12, wherein said embossings are microstructures running substantially transversely to the axial direction of flow of the honeycomb body.

14. The honeycomb body according to claim 1, wherein at least some of said counter-structures comprise two or more embossings spaced apart in the direction of flow.

15. The honeycomb body according to claim 12, wherein said embossings are formed with perforations.

16. The honeycomb body according to claim 12, wherein said embossings are formed with micro-perforations.

17. The honeycomb body according to claim 1, wherein at least some of said counter-structures are formed as holes.

18. The honeycomb body according to claim 1, wherein at least some of said counter-structures are holes formed in said substantially smooth layers, and said structural extremities and/or said inverted sections protrude into said holes.

19. The honeycomb body according to claim 1, wherein said structural extremities and/or said inverted sections engage in said holes substantially with a positive fit.

20. The honeycomb body according to claim 3, wherein at least some of said counter-structures are formed in said at least partially structured layers.

21. The honeycomb body according to claim 1, wherein a quotient of:
    A sum of a height of said inverted sections and a height of said counter-structures; and
    A radial distance between two walls of said cavities;
    Is less than 1.

22. The honeycomb body according to claim 1, wherein at least some of said layers are metallic layers.

23. The honeycomb body according to claim 22, wherein at least some of said metallic layers are sheet-metal layers.

24. The honeycomb body according to claim 23, wherein said sheet-metal layers have a thickness of less than 60 μm.

25. The honeycomb body according to claim 23, wherein said sheet-metal layers have a thickness of less than 40 μm.

26. The honeycomb body according to claim 23, wherein said sheet-metal layers have a thickness of less than 25 μm.

27. The honeycomb body according to claim 22, wherein at least some of said metallic layers are formed to at least partially allow a fluid to flow therethrough.

28. The honeycomb body according to claim 27, wherein at least some of said metallic layers are formed from a metallic fiber material.

29. The honeycomb body according to claim 27, wherein said fiber material is a sintered metallic fiber material.

30. The honeycomb body according to claim 1, wherein at least some of said layers are formed of a composite material.

31. The honeycomb body according to claim 1, wherein said composite material consists essentially of ceramic and metallic fibers.

32. The honeycomb body according to claim 1 configured as a catalyst support or a filter.

33. The honeycomb body according to claim 1 configured for integration into an exhaust system of a motor vehicle.

* * * * *